US009298391B2

(12) United States Patent
Smith et al.

(10) Patent No.: US 9,298,391 B2
(45) Date of Patent: Mar. 29, 2016

(54) APPLICATION PROGRAMMING INTERFACES FOR DATA SYNCHRONIZATION WITH ONLINE STORAGE SYSTEMS

(71) Applicant: Dropbox, Inc., San Francisco, CA (US)

(72) Inventors: Brian E. Smith, San Francisco, CA (US); Scott Bezek, San Francisco, CA (US); Jacob D. Potter, San Francisco, CA (US); Andrew R. Twyman, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 425 days.

(21) Appl. No.: 13/764,297

(22) Filed: Feb. 11, 2013

(65) Prior Publication Data
US 2014/0173230 A1 Jun. 19, 2014

Related U.S. Application Data

(60) Provisional application No. 61/739,621, filed on Dec. 19, 2012.

(51) Int. Cl.
*G06F 3/00* (2006.01)
*G06F 9/44* (2006.01)
*G06F 9/46* (2006.01)
*G06F 13/00* (2006.01)
*G06F 3/06* (2006.01)
*H04L 29/08* (2006.01)
*G06F 17/30* (2006.01)

(52) U.S. Cl.
CPC ........ *G06F 3/0655* (2013.01); *G06F 17/30575* (2013.01); *H04L 67/1095* (2013.01)

(58) Field of Classification Search
None
See application file for complete search history.

(56) References Cited

U.S. PATENT DOCUMENTS 5,584,012 A * 12/1996 Kojima et al. ................. 711/122
6,453,390 B1 * 9/2002 Aoki et al. ..................... 711/140

(Continued)

FOREIGN PATENT DOCUMENTS

EP 1452975 9/2004
EP 1647908 4/2006

(Continued)

OTHER PUBLICATIONS

"Sync Files Across Multiple Computers and Devices", 2012 SugarSync, Inc.: http://www.sugarsync.com/products/sync.html, Dec. 12, 2012.
"SugarSync for Developers—Getting Started", http://www.sugarsync.com/dev/getting-started.html, Dec. 12, 2012.

(Continued)

*Primary Examiner* — Hyung S. Sough
*Assistant Examiner* — William C Wood
(74) *Attorney, Agent, or Firm* — Park, Vaughan, Fleming & Dowler LLP; Chia-Hsin Suen

(57) ABSTRACT

The disclosed embodiments provide a system that manages access to data associated with an online storage system. During operation, the system enables synchronization of the data between an electronic device and the online storage system through an application programming interface (API) with an application on the electronic device. Next, the system uses the API to provide a synchronization state of the data to the application, wherein the synchronization state comprises at least one of a download state, an upload state, an idle state, a transfer progress, a cached state, and an error state.

20 Claims, 5 Drawing Sheets

(56) References Cited

U.S. PATENT DOCUMENTS

| | | | |
|---|---|---|---|
| 7,650,432 B2 | 1/2010 | Bosworth | |
| 2002/0111959 A1* | 8/2002 | Ching et al. | 707/201 |
| 2004/0172425 A1* | 9/2004 | Edelstein et al. | 707/203 |
| 2005/0044108 A1* | 2/2005 | Shah et al. | 707/104.1 |

FOREIGN PATENT DOCUMENTS

| | | |
|---|---|---|
| WO | 2005024665 | 3/2005 |
| WO | 2011031130 | 3/2011 |

OTHER PUBLICATIONS

Livenson, Ilya, et al., "Towards Integration of Heterogeneous Cloud Storage Platforms", DIDC 11, Jun. 8, 2011, San Jose, CA, Copyright 2011 ACM 978-1-4503-0704, Aug. 11, 2006.

Srinivasa, K.G. et al., "MEGHAOS: Cloud Based Operating System and a Framework for Mobile Application Development", copyright 2011 IEEE, 978-1-4673-0126.

"Mobeelizer—Synchronization as a Service for Mobile Apps", http://www.mobeelizer.com/features.html, Dec. 12, 2012.

* cited by examiner

APPLICATION PROGRAMMING INTERFACES FOR DATA SYNCHRONIZATION WITH ONLINE STORAGE SYSTEMS

RELATED APPLICATION

This application claims the benefit of U.S. Provisional Application No. 61/739,621, entitled "Application Programming Interfaces for Data Synchronization with Online Storage Systems," by inventors Brian Smith, Scott Bezek, Jacob D. Potter and Andrew R. Twyman, filed 19 Dec. 2012.

BACKGROUND

1. Field

The disclosed embodiments relate to online storage systems. More specifically, the disclosed embodiments relate to application programming interfaces (APIs) for data synchronization with online storage systems.

2. Related Art

Data on network-enabled devices is commonly synchronized, stored, shared, and/or backed up on online storage systems such as file hosting services, cloud storage services, and/or remote backup services. For example, data such as images, audio, video, documents, executables, and/or other files may be stored on a network-enabled electronic device such as a personal computer, laptop computer, portable media player, tablet computer, and/or mobile phone. A user of the electronic device may also have a user account with a cloud storage service that allows copies of the files to be stored and/or backed up with the cloud storage service. The cloud storage service may further transmit the copies to other electronic devices of the user and/or other users who are authorized to access the files, thus synchronizing the files between the cloud storage service and electronic devices.

Unfortunately, data synchronization between an electronic device and an online storage system is typically associated with limited interaction and/or information related to the synchronization state of the electronic device with the online storage system. For example, the electronic device may use a natively installed client application to create, delete, modify, and/or copy files with the online storage system. Alternatively, a third-party application on the electronic device may use an application programming interface (API) to perform reading, writing, copying, and/or other file-based operations with the online storage system. In both cases, the electronic device may lack information regarding the states associated with such file-based operations. For example, the client application and/or third-party application may be unable to identify an error associated with a failed file transfer and/or detect a newer version of a file on the online storage system. As a result, the user of the electronic device may experience reduced functionality and/or problems with synchronizing to the latest and/or correct versions of data from the online storage system.

Consequently, data synchronization between electronic devices and online storage systems may be facilitated by enabling access to synchronization states associated with the synchronization from the electronic devices.

SUMMARY

The disclosed embodiments provide a system that manages access to data associated with an online storage system. During operation, the system enables synchronization of the data between an electronic device and the online storage system through an application programming interface (API) with an application on the electronic device. Next, the system uses the API to provide a synchronization state of the data to the application, wherein the synchronization state comprises at least one of a download state, an upload state, an idle state, a transfer progress, a cached state, and an error state.

In some embodiments, the system also uses the API to provide a filesystem synchronization state of a filesystem comprising the data to the application, wherein the filesystem synchronization state comprises at least one of a metadata synchronization state, an online state, a running state, a ready state, and a change state.

In some embodiments, the system also enables synchronization of metadata for the filesystem with the electronic device through the API.

In some embodiments, the synchronization of the metadata for the filesystem with the electronic device is enabled using at least one of an open operation, a create operation, a delete operation, and a move operation.

In some embodiments, the change state is associated with at least one of a path, a directory, and a file.

In some embodiments, if the system accesses the data during synchronization of the data between the electronic device and the online storage system, accessing the data involves:

(i) if the synchronization state comprises the cached state, accessing the data from a cache on the electronic device;
(ii) if the synchronization state does not comprise the cached state, accessing the data from the online storage system;
(iii) if a newer version of the data is available, accessing the newer version; and
(iv) if the data is not available, indicating the error state.

In some embodiments, the synchronization state specifies a synchronization between the data on the online storage system and a copy of the data in a cache on the electronic device.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
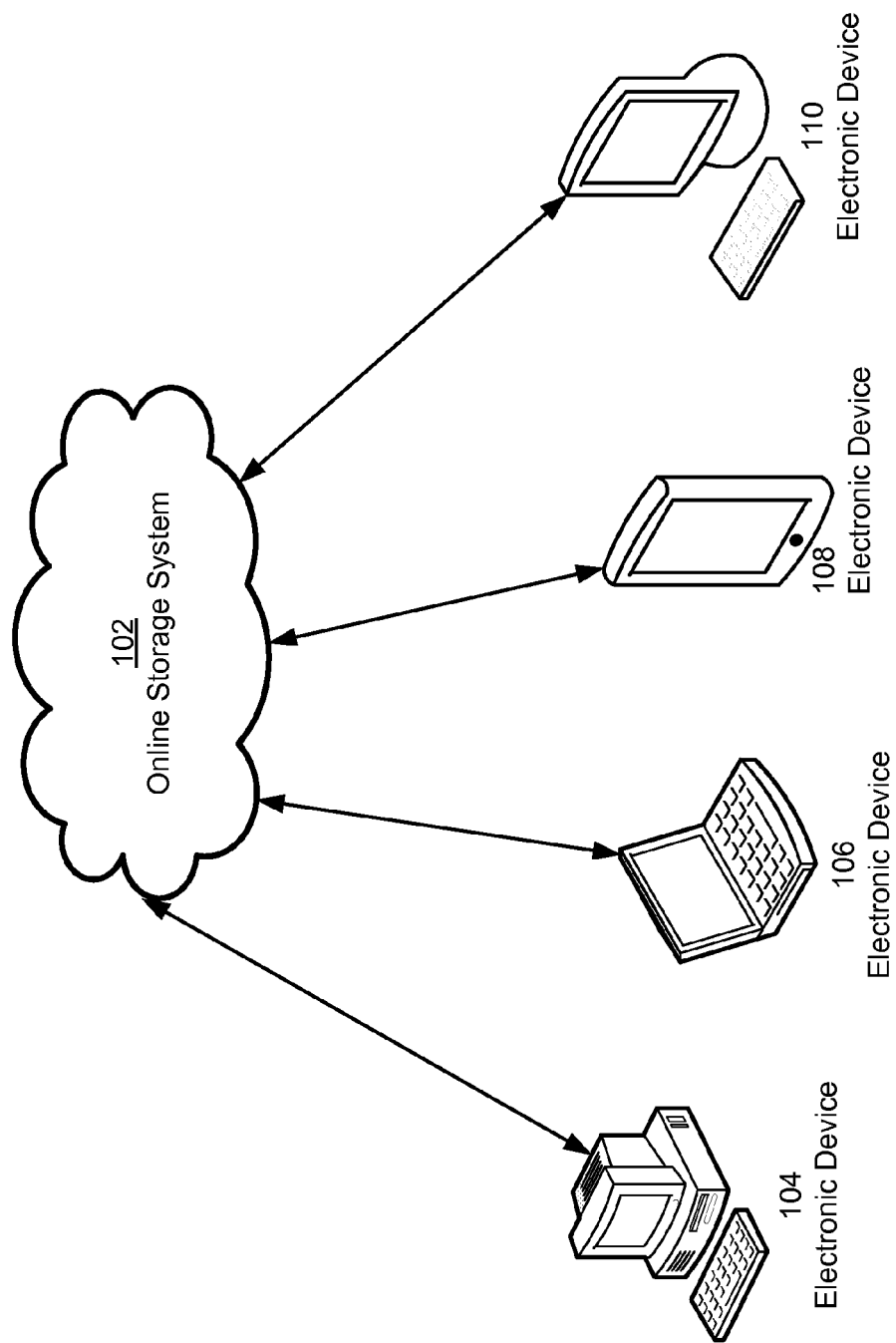
FIG. 1 shows a schematic of a system in accordance with the disclosed embodiments.

The disclosed embodiments provide a method and system for managing access to data associated with an online storage system. As shown in FIG. 1, an online storage system 102 may be accessed from a set of electronic devices 104-110, such as personal computers, laptop computers, tablet computers, mobile phones, personal digital assistants, portable media players, digital media receivers, and/or other network-enabled electronic devices. Communication between electronic devices 104-110 and online storage system 102 may be enabled by one or more networks, such as a local area network (LAN), wide area network (WAN), personal area network (PAN), virtual private network, intranet, cellular network, WiFi network, Bluetooth (Bluetooth™ is a registered trademark of Bluetooth SIG, Inc.) network, universal serial bus (USB) network, and/or Ethernet network.

During use of online storage system 102, users of electronic devices 104-110 may perform tasks related to storage, backup, retrieval, sharing, and/or synchronization of data. For example, each user may use an electronic device (e.g., electronic devices 104-110) to store images, audio, video, documents, executables, and/or other files with a user account of the user on online storage system 102. To access the files and/or user account, the user may provide authentication credentials for the user account to online storage system 102 from the electronic device. The user may also enable access to the files from other electronic devices by providing the same authentication credentials to online storage system 102 from the other electronic devices, authorizing access to the files from user accounts of the other users, and/or placing the files into a publicly accessible directory on online storage system 102.

To enable such storage, backup, sharing, synchronization, and/or access to data on online storage system 102, online storage system 102 may store the data using one or more storage mechanisms. For example, online storage system 102 may use one or more servers, cloud storage, network-attached storage (NAS), a storage area network (SAN), a redundant array of inexpensive disks (RAID) system, and/or other network-accessible storage to store the data. Online storage system 102 may additionally store the data using a variety of filesystem architectures and/or hierarchies and obscure the locations and/or mechanisms involved in storing the data from electronic devices 104-110.

In one or more embodiments, online storage system 102 is associated with a client application that supports automatic data synchronization between electronic devices 104-110 and online storage system 102. For example, the client application may be installed on each electronic device and automatically synchronize changes associated with a designated directory (e.g., new, deleted, modified, copied, and/or moved files and/or subdirectories within the directory) between the electronic device and online storage system 102. To perform such synchronization, the client application may monitor a local directory corresponding to the designated directory on the electronic device and synchronize changes to the local directory with a remote directory corresponding to the designated directory on online storage system 102. Conversely, the client application may identify changes to the remote directory and propagate the changes to the local directory. Because the client application is used directly by a user of the electronic device, the client application may hide and/or omit details of the synchronization from the user.

Figure 2:
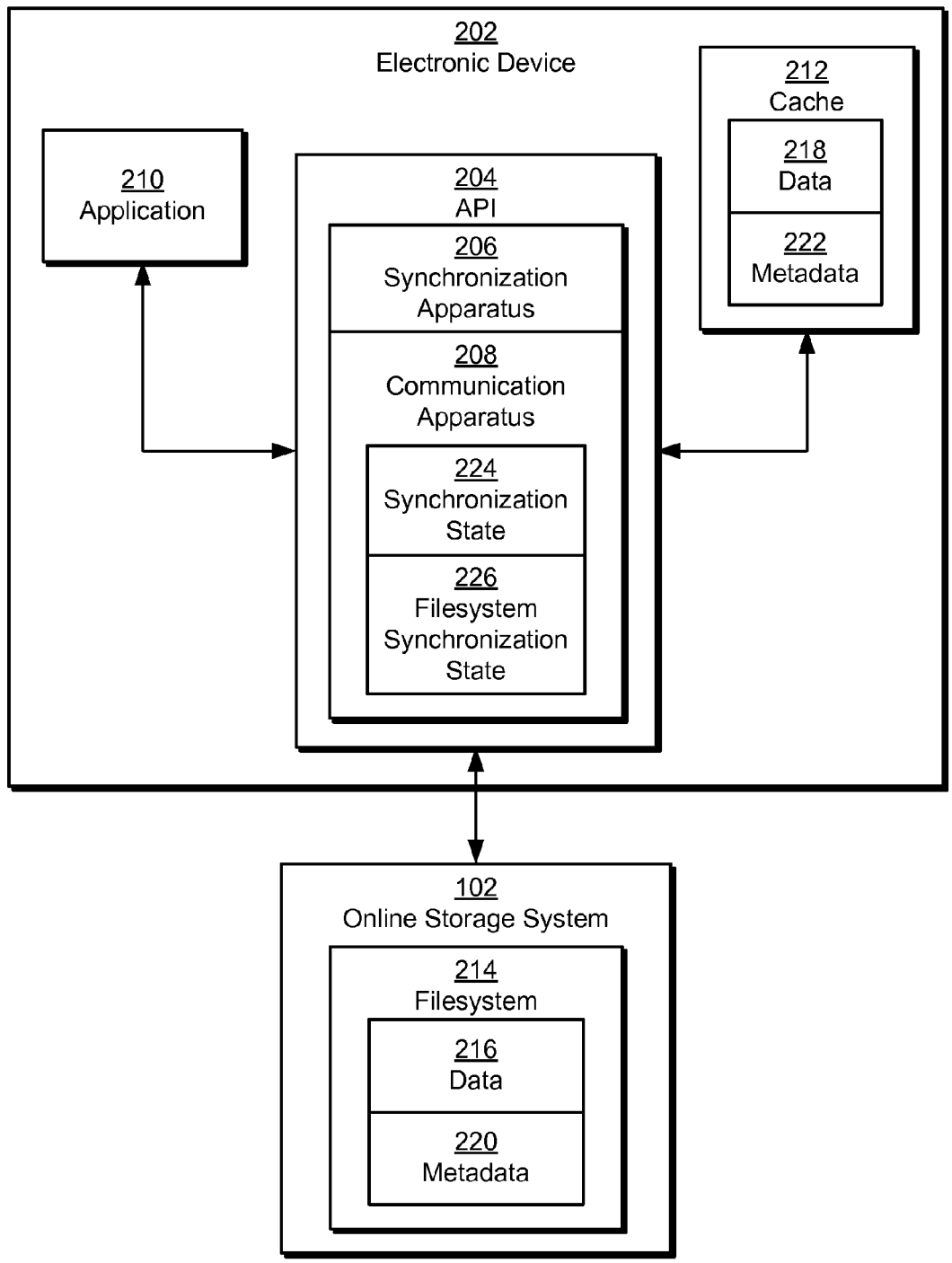
FIG. 2 shows a system for managing access to data associated with an online storage system in accordance with the disclosed embodiments.

As shown in FIG. 2, interaction between an electronic device 202 and online storage system 102 may further be facilitated by an application programming interface (API) 204 with an application 210 on electronic device 202, such as a third-party application that is not directly affiliated with online storage system 102. For example, API 204 may provide a set of method and/or function calls related to operations for reading, writing, copying, moving, deleting, and/or otherwise accessing data 216 on online storage system 102. In turn, application 210 may invoke the method and/or function calls to perform tasks such as backing up application data for application 210 and/or synchronizing user data (e.g., images, audio, video, text, documents, etc.) associated with application 210 with online storage system 102 and/or other electronic devices.

More specifically, a synchronization apparatus 206 associated with API 204 may synchronize data 218 in a local cache 212 of electronic device 202 with data 216 on online storage system 102. As described above, such synchronization may be accomplished by detecting changes in each set of data 216-218 and propagating the changes to the other set of data. For example, synchronization apparatus 206 may use a long polling technique to receive changes to data 216 from online storage system 102 and apply the changes to data 218. Synchronization apparatus 206 may also allow application 210 to detect changes to data 218 and upload the changes to online storage system 102 for synchronization with data 216.

In one or more embodiments, synchronization of data 216-218 is based on file-level operations available to application 210 through API 204, such as a read operation, a write operation, an update operation, and/or a close operation. The operations may appear to complete immediately after calls associated with the operations are made by application 210. At the same time, API 204 may propagate the operations to online storage system 102 and/or obtain updates associated with data 216-218 from online storage system 102 based on the availability of online storage system 102 and/or a network connection between electronic device 202 and online storage system 102.

In addition, synchronization apparatus 206 may synchronize metadata 220 for a filesystem 214 containing data 216 with a corresponding set of metadata 222 in cache 212. Metadata 220-222 may represent the directory hierarchy and paths associated with data 216-218. For example, metadata 220-222 may describe the contents (e.g., files, subdirectories, etc.) of directories in filesystem 214 that are accessible to electronic device 202 and/or application 210. Like data 216-218, metadata 220-222 may be synchronized by detecting changes to each set of metadata and propagating the changes to the other set of metadata.

In addition, synchronization of metadata 220-222 may be based on filesystem-level operations available to application 210 through API 204, such as an open operation, a create operation, a delete operation, and/or a move operation. Before such operations can be used by application 210, synchronization apparatus 206 may perform a first synchronization of metadata 220-222 by obtaining metadata 222 as a copy of metadata 220 from online storage system 102 and/or obtaining metadata 220 as a copy of metadata 222 from cache 212 and/or other local storage on electronic device 202. After the first synchronization is complete, synchronization apparatus 206 may enable access to filesystem 214 and/or data 216 from electronic device 202 and synchronize changes to metadata 220-222 by obtaining the changes from the set of metadata containing the changes and applying the changes to the other set of metadata.

To facilitate robust synchronization of data 216-218 and metadata 220-222 by application 210, a communication apparatus 208 associated with API 204 may provide a synchronization state 224 of data 216-218 and/or a filesystem synchronization state 226 of metadata 220-222 between electronic device 202 and online storage system 102 to application 210. Synchronization state 224 may specify a number of different states related to operations associated with synchronization of data 216-218. For example, synchronization state 224 may include a download state, an upload state, an idle state, a transfer progress, a cached state, and/or an error state for each file and/or other unit of data 216-218 to be synchronized between electronic device 202 and online storage system 102.

Similarly, filesystem synchronization state 226 may indicate various states related to operations associated with synchronization of metadata 220-222. For example, filesystem synchronization state 226 may include a metadata synchronization state, an online state, a running state, a ready state, and/or a change state for metadata 220-222 to be synchronized between electronic device 202 and online storage system 102.

More specifically, the above-described operations and/or states associated with synchronization of data 216-218 may be implemented using an interface for the state of a file and an interface for the file. The interface for the state of the file may include the following exemplary implementation.

```
typedef enum {
    DBFileStateDownloading,
    DBFileStateIdle,
    DBFileStateUploading,
} DBFileState;
/** The file status object exposes information about the
file's current sync status, including whether it's cached,
if it's uploading or downloading, and if it is uploading or
downloading the progress of that transfer */
@interface DBFileStatus : NSObject
/** @name Basic information */
/** Whether the contents of the file are cached locally and
can be read without making a network request. */
@property (nonatomic, readonly) BOOL cached;
/** @name Transfer information */
```

```
/** Whether the file is currently uploading, downloading, or
neither (idle) */
@property (nonatomic, readonly) DBFileState state;
/** If the file is transferring, the progress of the
transfer, between 0 and 1. */
@property (nonatomic, readonly) float progress;
/** If the file needs to be transferred, but can't for
whatever reason (such as no internet connection), then this
property is set to the last error that prevented the
transfer. */
@property (nonatomic, readonly) NSError *error;
@end
```

Within the interface, the "DBFileState" type may include one of three values: a "DBFileStateDownloading" value indicating synchronization state 224 as currently downloading (e.g., the download state), a "DBFileStateIdle" value indicating synchronization state 224 as currently idle (e.g., the idle state), or a "DBFileStateUploading" value indicating synchronization state 224 as currently uploading (e.g., the upload state). The interface may also include or exclude the cache state (e.g., caching of the file) in synchronization state 224 using a Boolean value named "cached," a transfer progress of the download and/or upload associated with "DBFileState" using a floating-point value named "progress," and an error state associated with the download and/or upload using an error code represented by "error."

Similarly, the interface for the file may include the following exemplary implementation:

```
typedef void (^DBFileObserver)( );
/** The file object represents a particular file at a
particular version. It has basic file operations such as
reading and writing the file's contents and getting info
about the file. It can also tell you the current sync status
and whether there's a newer version available, and allows
you to update to the newer version. */
@interface DBFile : NSObject
/** @name Basic operations */
/** Returns a read-only file handle for the file. If the
file is not cached then the method will block until the file
is downloaded.
   @return A file handle if the file can be read, or 'nil' if
an error occurred. */
- (NSFileHandle *)readHandle:(NSError **)error;
/** A wrapper for readHandle: that reads the entire file
contents into an NSData object.
   @return The file's contents if the file can be read, or
'nil' if an error occurred. */
- (NSData *)readData:(NSError **)error;
/** A wrapper for readHandle: that reads the entire file
contents as a UTF8 encoded string.
   @return The file's contents decoded as UTF8 if the file can
be read, or 'nil' if an error occurred. */
- (NSString *)readString:(NSError **)error;
/** Updates the file's contents with the contents of the
file at 'localPath'. If the file is not cached then an error
will be generated.
   @param shouldSteal whether the file at 'localPath' should
be copied or if it can be moved from its current location
into management by the Sync SDK. If you are done with the
file at 'localPath', then stealing is more efficient, but
the behavior of writing to the file after stealing
is undefined.
   @return YES if the file was written successfully, or NO if
an error occurred. */
- (BOOL)writeContentsOfFile:(NSString *)localPath
shouldSteal:(BOOL)shouldSteal error:(NSError **)error;
/** Updates the contents of the file to be the bytes store
in 'data'. If the file is not cached then an error will be
generated.
   @return YES if the file was written successfully, or NO if
an error occurred. */
```

```
- (BOOL)writeData:(NSData *)data error:(NSError **)error;
/** Updates the contents of the file as 'string' encoded in
UTF8. If the file is not cached then an error will be
generated.
    @return YES if the file was written successfully, or NO if
an error occurred. */
- (BOOL)writeString:(NSString *)string error:(NSError
**)error;
/** If there is a newer version of the file available, and
it is cached (determined by the cached property on
newerStatus), then this method will update the file object
to reference the newer version so it can be read from or
written to.
    @return YES if the file was written successfully, or NO if
an error occurred. */
- (BOOL)update:(NSError **)error;
/** Closes the file, preventing any further operations from
occurring and allowing the file to be opened again. This
happens automatically when the object is deallocated. */
- (void)close;
/** @name Getting the current state */
/** Whether the file is currently open. */
@property (nonatomic, readonly, getter=isOpen) BOOL open;
/** The current sync status for the file. */
@property (nonatomic, readonly) DBFileStatus *status;
/** The current sync status for the newer version of this
file. If the file is the newest version, then this property
is 'nil'. */
@property (nonatomic, readonly) DBFileStatus *newerStatus;
@end
```

Within the interface, a set of method calls "readHandle," "readData," and "readString" may be used to read data (e.g., data 216-218) from a file. Similarly, a set of method calls "writeContentsOfFile," "writeData," and "writeString" may be used to write to the file on online storage system 102 from a copy of the file in cache 212, a set of bytes in cache 212, a string, and/or a newer version of the file in cache 212. The "close" method call may be invoked to close the file and prevent subsequent reading from and/or writing to the file until the file is reopened. The interface may further use the "open" value to specify if the file is open or not, "status" to indicate the "DBFileStatus" of the file described above, and "newerStatus" to indicate the "DBFileStatus" of a newer version of the file. In other words, the interface may facilitate synchronization and/or management of different versions of the file between electronic device 202 and online storage system 102.

Furthermore, the above-described operations and/or states associated with synchronization of metadata 220-222 may be implemented using an interface for a filesystem (e.g., filesystem 214). The interface for the filesystem may include the following exemplary implementation:

```
/** A set of various fields indicating the current status of
the filesystem's syncing. */
enum DBSyncStatus {
    DBSyncStatusDownloading = (1 << 0),
    DBSyncStatusUploading = (1 << 1),
    DBSyncStatusSyncing = (1 << 2),
    DBSyncStatusOnline = (1 << 3),
};
typedef NSUInteger DBSyncStatus;
typedef void (^DBPathObserver)( );
/** The filesystem object provides a files and folder view.
The most basic operations are listing a folder and opening a
file, but it also allows you to move, delete, and create
files and folders. */
@interface DBFilesystem : NSObject
/** @name Creating a filesystem object */
/** Create a new filesystem object with a linked
[account](DBAccount) from the [account
manager](DBAccountManager).*/
- (id)initWithAccount:(DBAccount *)account;
/** A convenient place to store your app's filesystem */
+ (void)setSharedFilesystem:(DBFilesystem *)filesystem;
/** A convenient place to get your app's filesystem */
+ (DBFilesystem *)sharedFilesystem;
/** @name Getting file information */
/** Returns a list of DBFileInfo objects representing the
files contained in the folder at 'path'. If
completedFirstSync is false, then this call will block until
the first sync completes or an error occurs.
    @return An array of DBFileInfo objects if successful, or
'nil' if an error occurred. */
- (NSArray *)listFolder:(DBPath *)path error:(NSError
**)error;
/** Returns the [file info](DBFileInfo) for the file or
folder at 'path'. */
- (DBFileInfo *)fileInfoForPath:(DBPath *)path
error:(NSError **)error;
/** @name Operations */
/** Opens an existing file and returns a [file](DBFile)
object representing the file at 'path'.
    Files are opened at the newest cached version if the file
is cached, or at the newest server version if it's not
cached. Check the 'status' property of the returned file
object to determine whether it's cached. Only one file can
be open at a given path at the same time.
    @return The [file](DBFile) object if the file was opened
successfully, or 'nil' if an error occurred. */
- (DBFile *)openFile:(DBPath *)path error:(NSError **)error;
/** Creates a new file at 'path' and returns a file object
open at that path.
    @return The newly created [file](DBFile) object if the file
was opened successfuly, or 'nil' if an error occurred. */
- (DBFile *)createFile:(DBPath *)path error:(NSError
**)error;
/** Creates a new folder at 'path'.
    @return YES if the folder was created successfully, or NO
if an error occurred. */
- (BOOL)createFolder:(DBPath *)path error:(NSError **)error;
/** Deletes the file or folder at 'path'.
    @return YES if the file or folder was deleted successfully,
or NO if an error occurred. */
- (BOOL)deletePath:(DBPath *)path error:(NSError **)error;
/** Moves a file or folder at 'fromPath' to 'toPath'.
    @return YES if the file or folder was moved successfully,
or NO if an error occurred. */
- (BOOL)movePath:(DBPath *)fromPath toPath:(DBPath *)toPath
error:(NSError **)error;
/** @name Getting the current state */
/** The [account](DBAccount) object this filesystem was
created with. */
@property (nonatomic, readonly) DBAccount *account;
/** When a user's account is first linked, the filesystem
needs to be synced with the server before it can be used.
This property indicates whether that has completed and the
filesystem is ready to use. */
@property (nonatomic, readonly) BOOL completedFirstSync;
/** Whether the filesystem is currently running. The
filesystem will stop running if the account associated with
this filesystem becomes unlinked. */
@property (nonatomic, readonly, getter=isRunning) BOOL
running;
/** Returns a bitmask representing all the currently active
states of the filesystem OR'ed together. See the
DBSyncStatus enum for more details. */
@property (nonatomic, readonly) DBSyncStatus status;
/** @name Watching for changes */
/** Add an observer to be notified any time the file or
folder at 'path' changes. */
- (BOOL)addObserver:(id)observer forPath:(DBPath *)path
block: (DBPathObserver) block;
/** Add an observer to be notified any time the folder at
'path' changes or a file or folder directly contained in
'path' changes.' */
- (BOOL)addObserver:(id)observer forPathAndChildren:(DBPath
*)path block:(DBPathObserver)block;
/** Add an observer to be notified any time the folder at
'path' changes or a file or folder contained somewhere
```

```
beneath 'path' changes. */
- (BOOL)addObserver:(id)observer
forPathAndDescendants:(DBPath *)path
block: (DBPathObserver) block;
/** Unregister all blocks associated with 'observer' from
receiving updates. */
- (void)removeObserver:(id)observer;
@end
```

Within the interface, the "DBSyncStatus" type may use a "DBSyncStatus Downloading" bit to indicate if the filesystem is currently downloading to electronic device 202 from online storage system 102 (e.g., the download state) and a "DBSyncStatusUploading" bit to indicate if the filesystem is currently uploading from electronic device 202 to online storage system 102 (e.g., the upload state). "DBSyncStatus" may also include a "DBSyncStatusSyncing" bit to specify if synchronization of metadata 220-222 for the filesystem is occurring (e.g., the metadata synchronization state) and a "DBSyncStatusOnline" bit to specify if the filesystem and/or electronic device 202 are currently online (e.g., the online state). As a result, "DBSyncStatus" may be used to provide a portion of filesystem synchronization state 226.

The interface may also include method calls to operations for synchronizing metadata 220-222. Such method calls may include an "openFile" method call to an open operation that opens an existing file, a "createFile" method call to a create operation that creates a new file, and a "createPath" method call to a create operation that creates a new directory. The method calls may further include a "deletePath" method call to a delete operation that deletes a file and/or directory at a specified path and a "movePath" method call to a move operation that moves a file or directory to a specified path. Because the move operation is associated with an explicit method call, API 204 may be able to track the location and movement of a unique file over time. On the other hand, a client application for accessing online storage system 102 may lack the ability to perform such tracking because the client application executes a move operation by deleting a file or directory from one location and creating a file or directory in another location.

The interface may specify other portions of filesystem synchronization state 226 using a set of properties, including a "completedFirstSync" property that indicates the completion of the first synchronization of metadata 220-222 (e.g., the ready state) described above and a "running" property that indicates if the filesystem is running (e.g., the running state). The interface may also include a "Status" property that provides states associated with "DBSyncStatus."

Finally, the interface may provide one or more change states associated with paths, directories, and/or files in the filesystem. In particular, the interface may include a "forPath" change state that enables notification of changes to a specific path in the filesystem. The interface may also include a "forPathAndChildren" change state that enables notification of changes to a path and files and/or directories located directly beneath a path and/or a "forPathAndDescendants" change state that enables notification of changes to a path and all files and/or folders located somewhere beneath a path.

Application 210 and/or synchronization apparatus 206 may use information provided by synchronization state 224 and filesystem synchronization state 226 to synchronize data 216-218. For example, if synchronization state 224 includes the cached state, synchronization apparatus 206 may access data 218 from cache 212. If synchronization state 224 does not include the cached state, synchronization apparatus 206 may access data 216 from online storage system 102. If a newer version of data 216-218 is available, synchronization apparatus 206 may access the newer version from cache 212 and/or online storage system 102. Finally, if data 216-218 is not available, synchronization apparatus 206 may indicate the error state.

In other words, application 210 may use a single API 204 to access both local storage (e.g., cache 212) on electronic device 202 and online storage system 102. Moreover, synchronization state 224 and filesystem synchronization state 226 may expose information related to synchronization of data 216-218 and metadata 220-222 that allows application 210 to manage changes to data 216-218 and metadata 220-222, newer versions of data 216-218, and/or errors associated with the synchronization. In other words, API 204 may improve the efficiency, ease, and/or effectiveness of synchronizing data 216-218 and/or metadata 220-222 between application 210 and online storage system 102.

Those skilled in the art will appreciate that the system of FIG. 2 may be implemented in a variety of ways. As mentioned above, online storage system 102 may utilize a number of storage mechanisms and/or filesystem architectures to store data 216 and/or metadata 220. Similarly, synchronization apparatus 206 and communication apparatus 208 may be provided by various components and/or devices. For example, synchronization apparatus 206 and/or communication apparatus 208 may be implemented using a library on electronic device 202, online storage system 102, and/or a device (e.g., server) that acts as an intermediary between electronic device 202 and online storage system 102. Moreover, interaction between application 210 and API 204 may be enabled through a variety of programming languages, data types and structures, operations, states, and/or calls.

Figure 3:
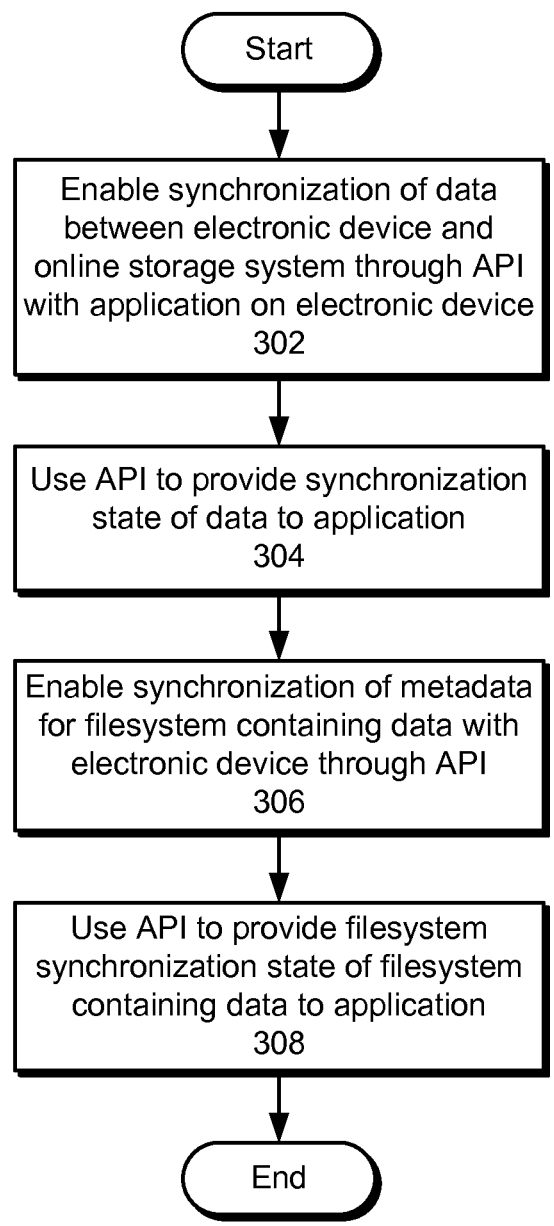
FIG. 3 shows a flowchart illustrating the process of managing access to data associated with an online storage system in accordance with the disclosed embodiments.

FIG. 3 shows a flowchart illustrating the process of managing access to data associated with an online storage system in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, synchronization of the data between an electronic device and the online storage system is enabled through an API with an application on the electronic device (operation 302). The API may include a set of method and/or function calls that the application may invoke to perform operations related to such data synchronization.

The API is also used to provide a synchronization state of the data to the application (operation 304). The synchronization state may describe synchronization between the data on the online storage system and a copy of the data in a cache on the electronic device. For example, the synchronization state may include a download state, an upload state, an idle state, a transfer progress, a cached state, and/or an error state. The synchronization state may then be used to access data during synchronization of the data, as described in further detail below with respect to FIG. 4.

Next, synchronization of metadata for a filesystem containing the data with the electronic device is enabled through the API (operation 306). Synchronization of the metadata may be enabled using an open operation, a create operation, a delete operation, and/or a move operation.

Finally, the API is used to provide a filesystem synchronization state of the filesystem to the application (operation 308). The filesystem synchronization state may include a metadata synchronization state, an online state, a running state, a ready state, and/or a change state. In addition, the change state may be associated with a path, a directory, and/or a file in the filesystem. The synchronization state and/or filesystem synchronization state may enable robust synchronization of both the data and metadata for the application, which in turn may improve use of the online storage system by the application.

Figure 4:
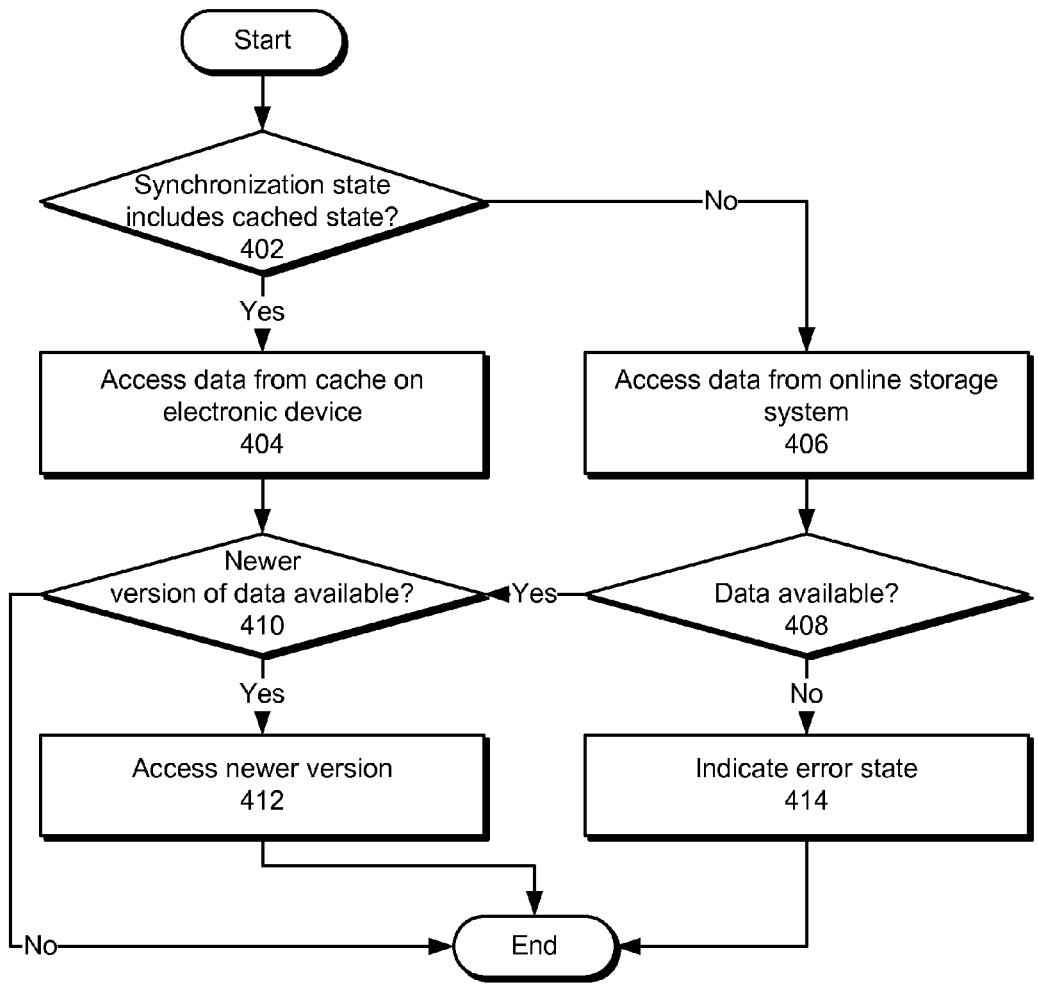
FIG. 4 shows a flowchart illustrating the process of accessing data during synchronization of the data between the electronic device and the online storage system in accordance with the disclosed embodiments.

FIG. 4 shows a flowchart illustrating the process of accessing data during synchronization of the data between the electronic device and the online storage system in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

First, access to the data may be based on the inclusion of a cached state in the synchronization state of the data (operation 402). The cached state may indicate the presence of the data on a local cache of the electronic device. The inclusion of the cached state in the synchronization state may thus result in accessing of the data from the cache (operation 404), while the absence of the cached state in the synchronization state may require access to the data from the online storage system (operation 406).

Accessing the data from the online storage system may further be based on an availability of the data (operation 408). For example, the data may not be available if the online storage system is not available and/or the electronic device lacks a network connection with the online storage system. If the data is not available, an error state is indicated (operation 414) to facilitate handling of the error state and/or subsequent access to the data. If the data is available, no error state is indicated.

A newer version of the data may also be available (operation 410) from the cache and/or the online storage system. If a newer version is not available (e.g., does not exist, is not accessible, etc.), the existing version of the data is accessed.

If the newer version is available, the newer version is accessed (operation 412). For example, the existing version of the data from the cache and/or online storage system may continue to be accessed using operations 404-406 while the newer version is configured for access (e.g., downloaded). Once the newer version is ready to be accessed, the existing version is replaced with the newer version.

Figure 5:
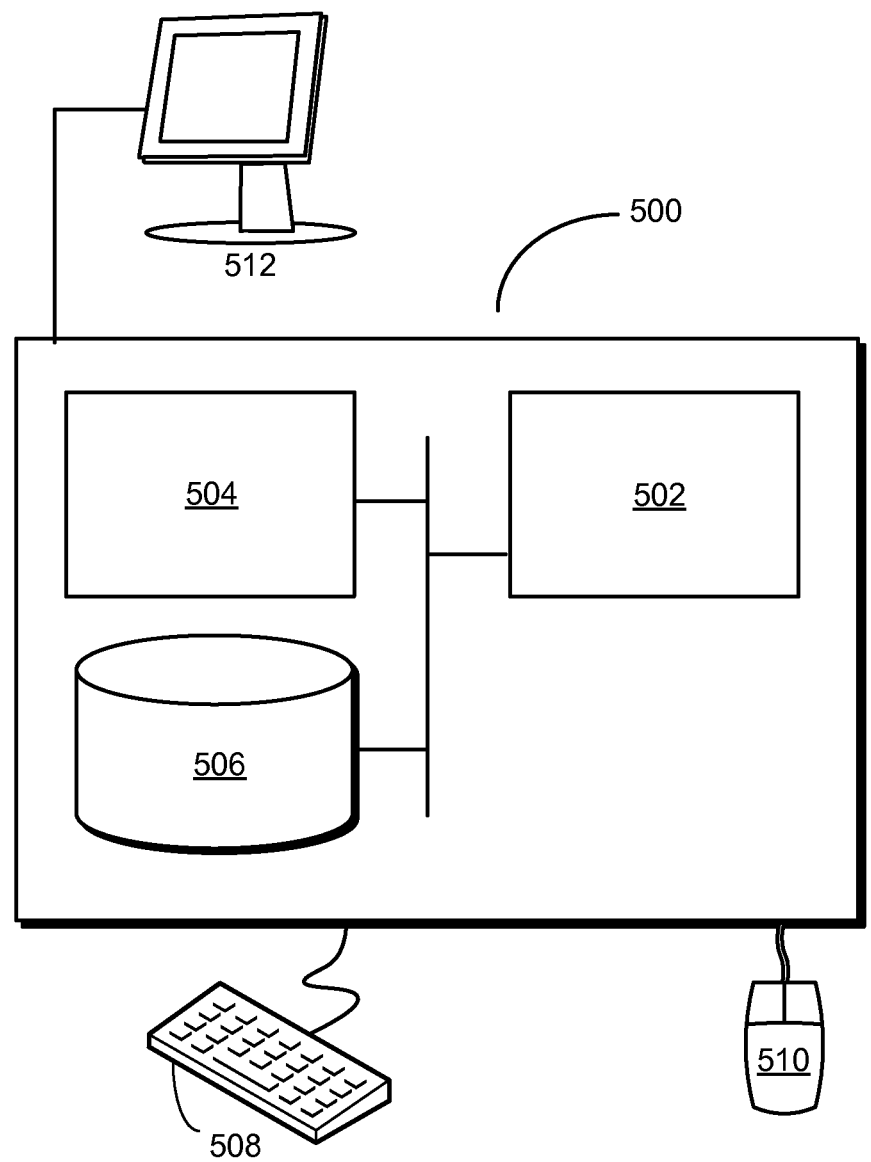
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for managing access to data associated with an online storage system. The system may include a synchronization apparatus that enables synchronization of the data between an electronic device and the online storage system through an API with an application on the electronic device. The system may also include a communication apparatus that uses the API to provide a synchronization state of the data to the application. The synchronization state may include a download state, an upload state, an idle state, a transfer progress, a cached state, and/or an error state.

The synchronization apparatus may also enable synchronization of metadata for a filesystem containing the data with the electronic device through the API, and the communication apparatus may use the API to provide a filesystem synchronization state of the filesystem to the application. The filesystem synchronization state may include a metadata synchronization state, an online state, a running state, a ready state, and/or a change state.

In addition, one or more components of computer system 500 may be remotely located and connected to the other components over a network. Portions of the present embodiments (e.g., communication apparatus, synchronization apparatus, etc.) may also be located on different nodes of a distributed system that implements the embodiments. For example, the present embodiments may be implemented using a cloud computing system that provides an API for synchronizing data between a set of remote electronic devices and a storage mechanism associated with the cloud computing system.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for managing access to data associated with an online storage system, comprising:
    enabling synchronization of the data between an electronic device and the online storage system, wherein changes to the data are automatically synchronized between the electronic device and the online storage system, wherein an application programming interface (API) facilitates determining a synchronization state for the data, wherein the synchronization state comprises at least one of a download state, an upload state, an idle state, a transfer progress, a cached state, and an error state;
    receiving a request to access the data;
    using the API to determine the synchronization state for the data; and
    determining from the synchronization state that the requested data is presently being synchronized between the electronic device and the online storage system.

2. The computer-implemented method of claim 1, wherein the request is received on the electronic device, wherein the computer-implemented method further comprises:
    determining from the synchronization state that the data is presently in the download state, wherein the download state indicates that a synchronization operation is presently downloading a new version of the data to the electronic device;
    determining from the synchronization state that an existing version of the data is available on the electronic device;
    accessing the existing version of the data during the synchronization operation; and
    upon detecting the completion of the synchronization operation, replacing the existing version of the data with the new version of the data.

3. The computer-implemented method of claim 1, wherein the request is received on the electronic device, wherein the computer-implemented method further comprises:
    determining from the synchronization state that the data is presently in the upload state, wherein the upload state indicates that a local version of the data on the electronic device is the most up-to-date version of the data and that the synchronization operation is presently synchronizing the local version of the data to the online storage system; and
    accessing the local version of the data on the electronic device during and subsequent to the synchronization operation.

4. The computer-implemented method of claim 1, wherein the request is received on the electronic device, wherein the computer-implemented method further comprises:
    determining from the synchronization state that the data is presently in the download state, wherein the download state indicates that a synchronization operation is presently downloading a new version of the data to the electronic device;
    determining from the synchronization state that no existing version of the data is presently available on the electronic device;
    using the API to access the data via the online storage system during the synchronization operation; and
    using the API to access the data via the electronic device upon detecting the completion of the synchronization operation;
    wherein the API facilitates transparently accessing the data via both the local storage of the electronic device and the online storage system during the synchronization operation.

5. The computer-implemented method of claim 1, wherein the request is received on the electronic device, wherein the computer-implemented method further comprises:
    determining from the synchronization state that the data is presently in the download state, wherein the download state indicates that a synchronization operation is presently downloading a new version of the data to the electronic device;
    determining from the synchronization state that no existing version of the data is presently available on the electronic device;
    using the API to determine that the data is not presently available via the online storage system; and
    indicating an error state for the request.

6. The computer-implemented method of claim 1, wherein if the method accesses the data during synchronization of the data between the electronic device and the online storage system, accessing the data comprises:
    if the synchronization state comprises the cached state, accessing the data from a cache on the electronic device;
    if the synchronization state does not comprise the cached state, accessing the data from the online storage system;
    if a newer version of the data is available, accessing the newer version; and
    if the data is not available, indicating the error state.

7. The computer-implemented method of claim 1, wherein the synchronization state specifies a synchronization between the data on the online storage system and a copy of the data in a cache on the electronic device.

8. A system for managing access to data associated with an online storage system, comprising:
    a processor;
    a memory storing instructions that, when executed by the processor, cause the system to:
        enable synchronization of the data between an electronic device and the online storage system, wherein changes to the data are automatically synchronized between the electronic device and the online storage system, wherein an application programming interface (API) facilitates determining a synchronization state for the data, wherein the synchronization state comprises at least one of a download state, an upload state, an idle state, a transfer progress, a cached state, and an error state;
        receive a request to access the data;
        use the API to determine the synchronization state for the data; and
        determine from the synchronization state that the requested data is presently being synchronized between the electronic device and the online storage system.

9. The system of claim 8, wherein the memory further stores instructions that cause the system to:
    use the API to provide a filesystem synchronization state of a filesystem comprising the data, wherein the filesystem synchronization state comprises at least one of a metadata synchronization state, an online state, a running state, a ready state, and a change state.

10. The system of claim 9, wherein the memory further stores instructions that cause the system to:
    enable synchronization of metadata for the filesystem with the electronic device through the API.

11. The system of claim 10, wherein the synchronization of the metadata for the filesystem with the electronic device is enabled using at least one of an open operation, a create operation, a delete operation, and a move operation.

12. The system of claim 9, wherein the change state is associated with at least one of a path, a directory, and a file.

13. The system of claim 8, wherein the memory further stores instructions that cause the system to, if the data is accessed during synchronization of the data between the electronic device and the online storage system:
    if the synchronization state comprises the cached state, access the data from a cache on the electronic device;
    if the synchronization state does not comprise the cached state, access the data from the online storage system;
    if a newer version of the data is available, access the newer version; and
    if the data is not available, indicate the error state.

14. The system of claim 8, wherein the synchronization state specifies a synchronization between the data on the online storage system and a copy of the data in a cache on the electronic device.

15. A non-transitory computer-readable storage medium storing instructions that when executed by a computer cause the computer to perform a method for managing access to data associated with an online storage system, the method comprising:
    enabling synchronization of the data between an electronic device and the online storage system, wherein changes to the data are automatically synchronized between the electronic device and the online storage system, wherein an application programming interface (API) facilitates determining a synchronization state for the data, wherein the synchronization state comprises at least one of a download state, an upload state, an idle state, a transfer progress, a cached state, and an error state;
    receiving a request to access the data;
    using the API to determine the synchronization state for the data; and
    determining from the synchronization state that the requested data is presently being synchronized between the electronic device and the online storage system.

16. The computer-readable storage medium of claim 15, the method further comprising:
   using the API to provide a filesystem synchronization state of a filesystem comprising the data, wherein the filesystem synchronization state comprises at least one of a metadata synchronization state, an online state, a running state, a ready state, and a change state.

17. The computer-readable storage medium of claim 16, the method further comprising:
   enabling synchronization of metadata for the filesystem with the electronic device through the API.

18. The computer-readable storage medium of claim 17, wherein the synchronization of the metadata for the filesystem with the electronic device is enabled using at least one of an open operation, a create operation, a delete operation, and a move operation.

19. The computer-readable storage medium of claim 16, wherein the change state is associated with at least one of a path, a directory, and a file.

20. The computer-readable storage medium of claim 15, wherein if the method accesses the data during synchronization of the data between the electronic device and the online storage system, accessing the data comprises:
   if the synchronization state comprises the cached state, accessing the data from a cache on the electronic device;
   if the synchronization state does not comprise the cached state, accessing the data from the online storage system;
   if a newer version of the data is available, accessing the newer version; and
   if the data is not available, indicating the error state.

* * * * *